United States Patent [19]

Stange

[11] 4,189,620
[45] Feb. 19, 1980

[54] CABLE TERMINATION DEVICE

[76] Inventor: William F. Stange, 1501 W. Clifton Blvd., Lakewood, Ohio 44107

[21] Appl. No.: 895,267

[22] Filed: Apr. 10, 1978

[51] Int. Cl.² .................. H01R 11/00; H02G 15/02
[52] U.S. Cl. .................................. 174/79; 403/275
[58] Field of Search ............ 174/79, 70 R, 94 R; 403/185, 274, 275; 24/136, 122.6; 24/136 L, 136 R

[56] References Cited

U.S. PATENT DOCUMENTS

| 206,321 | 7/1878 | Heaton | 403/274 |
|---|---|---|---|
| 1,857,436 | 5/1932 | Cole | 403/185 |
| 2,341,992 | 2/1944 | King et al. | 24/136 |
| 3,226,470 | 12/1965 | Bryant | 174/79 |
| 3,573,346 | 4/1971 | Appleby | 174/79 X |
| 3,723,636 | 3/1973 | Eucker | 174/70 R |
| 3,775,811 | 12/1973 | Smrekar et al. | 24/122.6 |
| 3,829,937 | 8/1974 | Metzler | 174/79 X |

Primary Examiner—Roy N. Envall, Jr.
Attorney, Agent, or Firm—Fay & Sharpe

[57] ABSTRACT

A termination device utilizes a frusto-conical wedge positioned on the cable for forming a protuberance thereon at the area of termination. A first set of helical elements having a helical lay of one hand is disposed in a surrounding relationship with at least an axial portion of the cable with the cable and first set of helical elements being received through a longitudinal bore extending between the opposed wedge ends. A second set of helical elements having a helical lay of the opposite hand closely encircle the wedge outer surface at least between the opposed wedge ends and also encircle at least a portion of the first set of helical elements extending outwardly from the wedge bore at the smaller diameter wedge lead end. For conventional electrical conductor cable or the like, the first and second sets of elements are comprised of preformed helical rods having predetermined internal diameters and pitch lengths. For conventional armored cable, the first set of elements comprises the inner layer of armor strands and the second set of elements comprises the outer layer of armor strands. The wedge, along with the associated portions of the cable and first and second sets, is received within a housing. A retainer member continuously urges and pre-loads the wedge into a housing frusto-conical passageway, the passageway being conveniently defined by a subhousing receivable in the housing to facilitate assembly of the termination device in the field externally of the housing.

11 Claims, 8 Drawing Figures

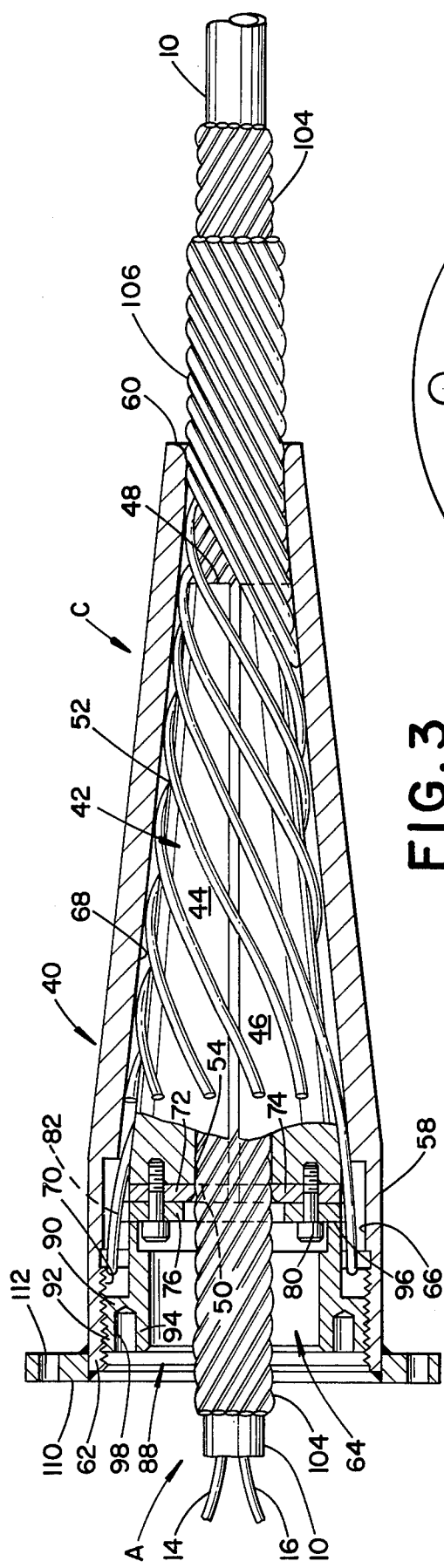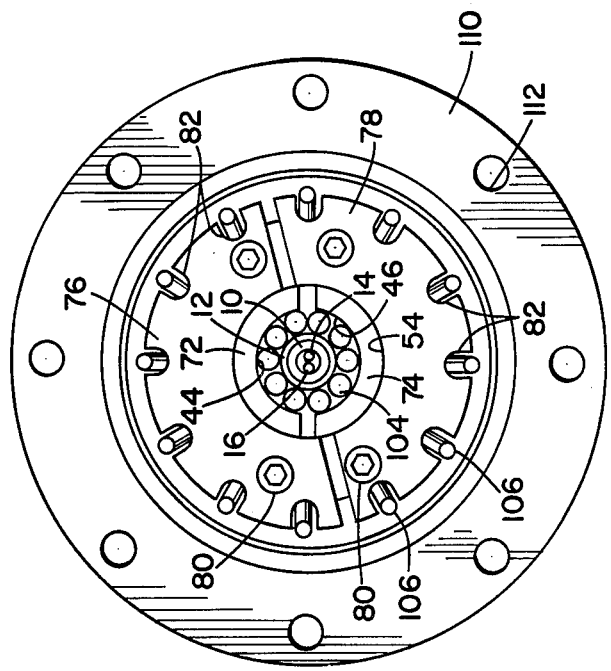
FIG.3
FIG.4

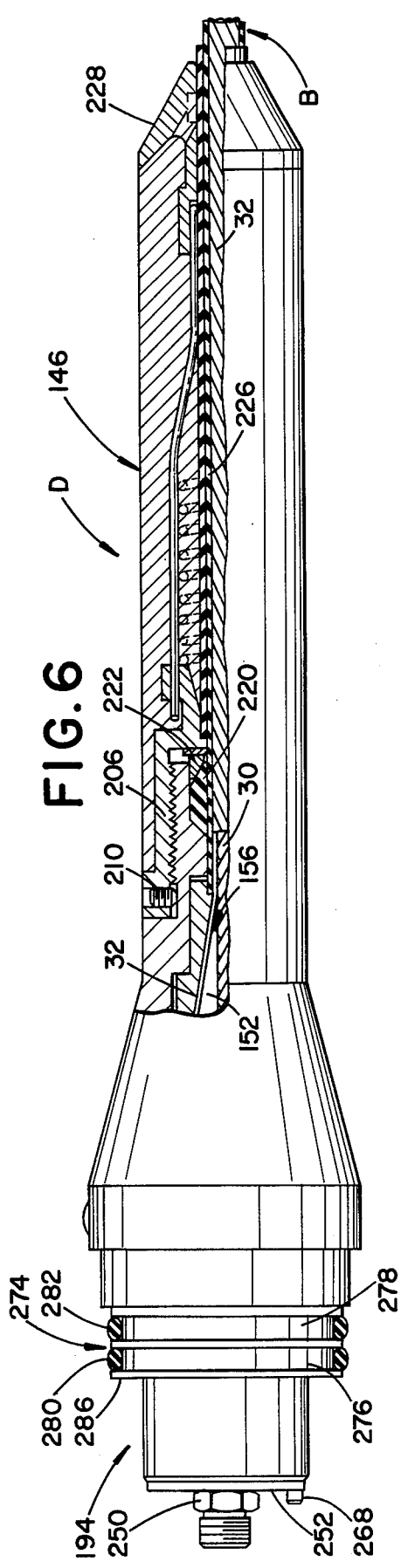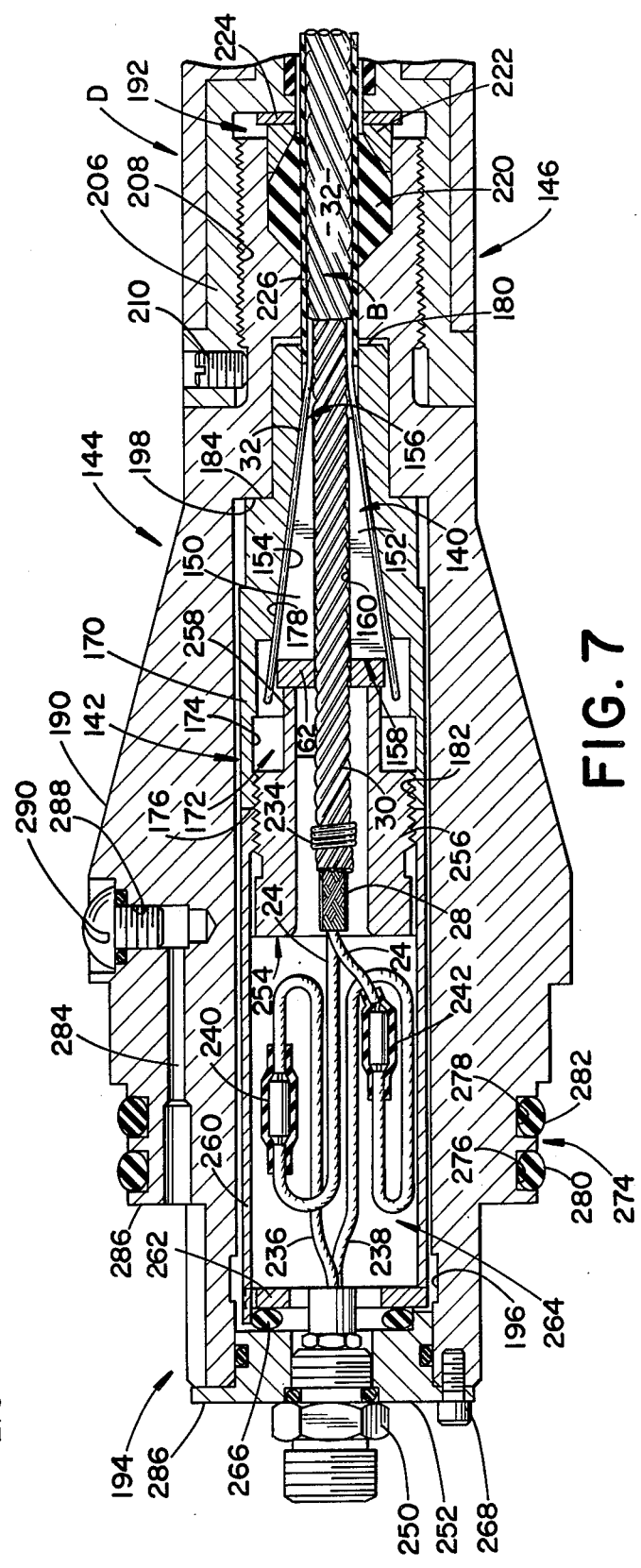

CABLE TERMINATION DEVICE

BACKGROUND OF THE INVENTION

This development pertains to the art of connectors and more particularly to cable termination devices.

The concept involved is particularly applicable to a termination device used for electrical conductor cables or the like and will be described with particular reference thereto. The cables of this general type with which the subject invention finds advantageous utilization are particularly used in undersea applications such as when an electronic monitoring array is towed through the ocean by a surface vessel. Electrical monitoring arrays of many types are used for security and defense purposes as well as undersea research. However, it will become apparent to those skilled in the art that the development has far broader applications and uses in other environments which utilize electrical conductor cables or the like.

Typically in such environments, two different types of electrical conductor cables are employed. The first comprises elongated continuous electrical conductors surrounded by a sheath material which, in turn, is surrounded by an outer protective cover generally constructed from a plastic matrerial. The second is commonly referred to as armored type cable in that the elongated continuous electrical conductors are surrounded by an inner layer of helical armor elements or strands which, in turn, are surrounded by an outer layer of helical armor elements or strands. The helical lay of the elements which comprise the inner set are of one hand and the helical lay of the elements which comprise the outer set are of the opposite hand. Heretofore, there have been a number of attempts at providing termination devices or appliances for these types of cables, although there have been a number of practical and operational difficulties encountered therewith.

These difficulties stemmed from the fact that prior termination appliance designs were oftentimes complicated so that field installation and use thereof was made rather difficult and ineffective. In many situations, field installation was virtually impossible. Moreover, many prior termination device designs were fairly expensive and caused undesirable twisting torques to be applied to the cables resulting in cable damage. Some prior devices necessitated modifying the cable or damaging the cable integrity to accomplish the desired installation.

Accordingly, it has been desired to provide a termination device which overcomes all of the above noted problems. The concepts of the subject development are deemed to meet this need and provides a termination device which is simple in design, inexpensive, easy to use and install in the field, is strong, increases holding strength as a load is applied to the cable, does not exert destructive twisting torque forces to the cable and which does not involve any destruction or damage to the overall integrity of the cable when installed.

BRIEF DESCRIPTION OF THE DEVELOPMENT

In accordance with the present development, there is provided a termination appliance or device for installation for an elongated cable member. In combination, the installation comprises a first set of helical elements of a predetermined general internal diameter and pitch length wrapped in an encircling relationship about the cable member for at least a predetermined axial distance therealong in a helical lay of one hand. A cable member receiving wedge is provided to have a generally frusto-conical side wall configuration extending between a smaller diameter lead end and a larger diameter rear end with a central bore passing therethrough between these ends. The wedge is received over a longitudinal section of the first element set and cable member adjacent the desired area of termination so that the first set and cable member extend outwardly from the bore at the wedge lead end. A second set of helical elements of a predetermined general internal diameter and pitch length are wrapped in a close generally encircling relationship along the wedge side wall from at least adjacent the wedge rear end to the lead end and then in an encircling relationship with the first element set and cable member for at least a predetermined distance therealong outwardly from the wedge lead end. The wedge thus provides a retaining protuberance secured to the cable member. The helical lay of the second set of elements is of the opposite hand from the helical lay of the first set. Also provided is an elongated housing having first and second ends with a passageway communicating therebetween. The passageway has a generally cylindrical portion extending inwardly from the second end merging into a generally frusto-conical portion tapering inwardly toward the first end. The frusto-conical portion is dimensioned to closely and at least substantially receive the wedge and that portion of the second set of helical elements which are wrapped in a close generally encircling relationship therewith. At the housing first end, the passageway is dimensioned to permit the cable member and first helical element sets to pass therethrough outwardly of the housing.

In accordance with another aspect of the present development, the wedge includes means for translating the radial forces imparted thereto when the wedge is closely inserted into the passageway frusto-conical portion to the first set of helical elements and the cable member to thereby increase the retaining force of the termination device on the cable member.

In accordance with another aspect of the present development, retainer means are received in the housing passageway from the housing second end for preloading the wedge and for positively confining it at least substantially in the passageway frusto-conical portion.

In accordance with a still further aspect of the present development, a circular flange area is provided at the wedge rear end and dimensioned to have a diameter slightly greater than the diameter of the rear end so as to extend radially outward thereof circumferentially therearound. This flange area further includes a plurality of spaced apart radially inward extending slots generally axially along the outer peripheral surface thereof which receive the end areas of the individual elements comprising the second set.

According to a further aspect of the present development, the wedge is positioned so that the cable member and first set of helical elements protrude outwardly of the wedge bore at both the leading and rear ends. The second set of helical elements encircle at least a portion of the length of the first set extending outwardly from the bore at the wedge lead end, then closely generally encircle the wedge from the lead end to the rear end and then extend back to an encircling relationship with a portion of the length of the first set protruding outwardly from the bore at the wedge rear end.

According to with yet another aspect of the present development, the first and second sets of helical elements comprise preformed helical rods affixed to the cable member over selected lengths thereof at the appliance or device installation. The first set of helical rods closely encircle a portion of the cable member and the second set of helical rods closely encircle at least a portion of the first set for balancing the torque applied to the cable member by the termination device.

In accordance with still an additional aspect of the present development, the cable member comprises armored type cable having a conductor inner core with the first set of helical elements comprising an inner layer of armor elements or strands and the second set of helical elements comprising an outer layer of armor elements or strands. The inner and outer layers of armor elements extend substantially longitudinally coextensive with the conductor inner core itself.

The principal object of the present development is the provision of a new termination appliance or device which provides vastly improved termination connections over prior known termination devices.

Another object of the present development is the provision of a new termination device which is simple in design, easy to use in practical applications and readily adapted to field installations.

Yet a further object of the present development is the provision of a new termination device which is readily adapted to use in cable termination applications in many different environments.

Other objects and advantages for the development will become apparent to those skilled in the art upon a reading and understanding of the following specification.

BRIEF DESCRIPTION OF THE DRAWINGS

The subject new termination device may take physical form in certain parts and arrangements of parts, preferred embodiments of which will be described in detail in this specification and illustrated in the accompanying drawings which form a part hereof and wherein:

FIG. 3 is a partial cross-sectional view showing one preferred embodiment incorporating the concepts of the development;

FIG. 4 is an end view of the arrangement shown in FIG. 3 with the retainer means removed for ease of illustration;

FIG. 6 is a side elevational view in partial cross-section showing another preferred arrangement incorporating the concepts of the subject development;

FIG. 7 is an enlarged cross-sectional view of a portion of the structural arrangement shown in FIG. 6; and, FIG. 8 is a partial view substantially identical to that of FIGS. 6 and 7 showing a still further arrangement incorporating the concepts of the subject development.

DETAILED DESCRIPTION OF THE PREFERRED EMBODIMENTS

Figure 1:
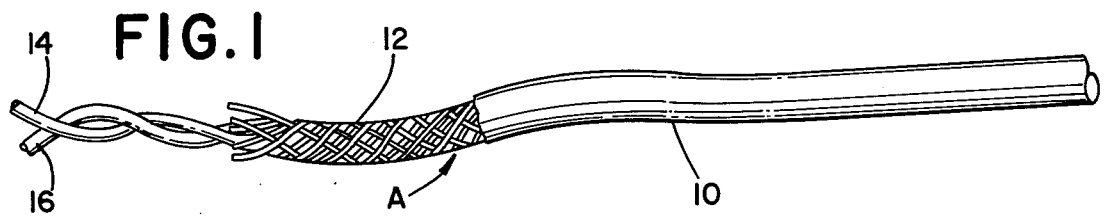
FIG. 1 is a view of a typical sheathed cable for which the subject development finds particular termination application.

Referring now to the drawings wherein the showings are for purposes of illustrating preferred embodiments of the invention only and not for purposes of limiting same, the Figures show a sheathed cable A, an armored cable B and termination devices C and D particularly adapted for use in conjuction with cables A, B respectively.

More particularly, and with reference to FIG. 1, sheathed cable A is comprised of an outer protective cover 10 normally constructed from a plastic material. Beneath cover 10 is a sheathed braided material 12. A synthetic material commonly used for encasing electrical conductors, telephone conductors and the like is manufactured by E. I. du Pont de Nemours and Company and marketed under the trademark KEVLAR. The inner strands or electrical conductors themselves are designated by numerals 14,16 in FIG. 1. The specific construction of cable member A does not form any part of the present invention and is known in the art. Rather, the cable member construction shown is merely for purposes of appreciating the manner of operation for the subject termination device or appliance in a typical application. The specific number of inner strands or conductors may vary as necessary or desired from the two shown and designated 14,16 in FIG. 1 and the basic overall construction of cable A may vary from installation to installation without in any way affecting the overall operation of the present development.

Figure 2:
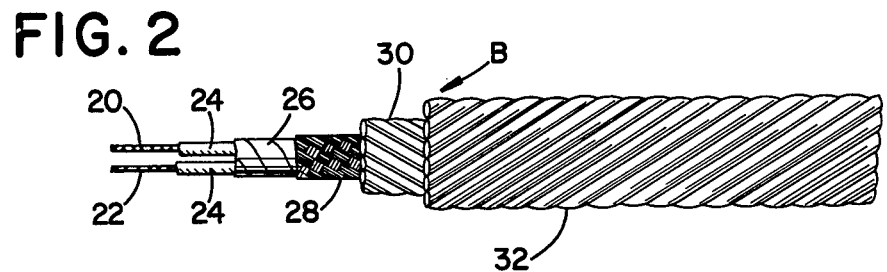
FIG. 2 is a view of a typical armored cable for which the subject invention also finds particular termination application.

The subject development also finds particular use with conventional armored type cable such as that designated B in FIG. 2. The cable there shown is comprised of a pair of inner strands or conductors 20,22 having a coating of insulation 24 disposed therearound. A binder tape 26 is wrapped around the conductors and insulation over the length thereof with a bedding braid 28 closely surrounding binder tape 26. Members 20,22,24,26 and 28 comprise what is commonly referred to as the cable core. This core is then closely surrounded by a first set of helically formed metal strands or elements generally designated 30 which define an inner armor layer. These elements have a helical lay of one hand which is, typically, left hand. A second set of helical strands or elements 32 are closely received around the strands 30 of the inner layer to form an outer armor layer. The number of individual elements 30,32 which comprise the inner and outer layers vary and, in the cable arrangement shown in FIG. 2, the inner layer has twelve (12) strands 30 and the outer layer has fourteen (14) strands 32. Moreover, the individual elements 30,32 which comprise each of the layers may be of the same or different diameters. Such modifications do not in any way affect the overall scope of the present termination device and the showing in FIG. 2 is for purposes of illustrating the typical armored cable structure. The inner and outer layers helically surround and protect the cable core substantially over the entire length thereof.

With particular reference to FIGS. 3 and 4, description will hereinafter be made to termination device C which is shown as used with cable member A of FIG. 1. More particularly, device or appliance C is comprised of a housing generally designated 40 which receives a frusto-conical cable wedge 42. This wedge is defined by a pair of mating wedge halves 44,46 which matingly cooperate with each other in a manner to define the wedge so it has a smaller diameter lead end 48, a larger diameter rear end 50 and a generally frusto-conical side wall 52. Each wedge half 44,46 includes a longitudinal generally semi-circular recess extending between the lead and rear ends in order to cooperatively define a generally circular bore 54. Bore 54 as defined by the wedge halves is dimensioned so that it will be closely received over a first set of helical preformed rods which themselves are closely received over cable member A in a manner to be described hereinafter.

Housing 40 includes first end 60 and a second end 62 with a passageway 64 communicating therebetween. The passageway itself includes a generally cylindrical portion 66 extending inwardly from second end 62 which merges into a generally frusto-conical portion 68 tapering inwardly toward first end 60. Frusto-conical portion 68 is dimensioned to closely receive wedge 42 and a second set of helical preformed members in a manner to be described. Passageway cylindrical portion 66 includes a threaded area 70 extending inwardly from second end 62 toward the area of merger with frusto-conical portion 68. Also, the frusto-conical portion of the passsageway is slightly belled outwardly at housing first end 60 for eliminating undue bending stresses on the cable during practical application and use of the termination device.

A pair of arcuate alignment washer halves 72,74 (FIG. 4) are disposed at the rear end of the wedge in order to retain the two wedge halves in longitudinal alignment. Disposed adjacent these alignment washer halves are a pair of flange halves 76,78 (FIG. 4). These alignment washer and flange halves are fixedly connected to the wedge halves by means of conventional threaded fasteners 80 (FIG. 4). As shown, alignment washer halves 72,74 and flange halves 76,78 are positioned relative to wedge halves 44,46 so that each cooperates with each wedge half in order that the wedge halves will be longitudinally aligned when threaded fasteners 80 are advanced into the wedge halves. Of course, the alignment washer arrangement could take other forms than the halves 72,74 shown in the drawings and could be of a single piece construction without in any way departing from the intent or scope of the present invention.

It will be seen from FIGS. 3 and 4 that flange halves 76,78 have an outer diameter greater than the outer diameter of wedge 42 at rear end 50 so as to extend radially outward thereof. Moreover, as shown in FIG. 4, these flange halves include a plurality of radially inward extending axial slots 82 at the outer peripheral surfaces thereof to individually receive the ends of a second set of helical elements as will be described hereinafter. While twelve (12) such slots are particularly shown in FIG. 4, a greater or lesser number may be required by the second elements used to accommodate a particular cable member A design and dimension without in any way departing from the overall intent or scope of the present invention. When there is a variation in the number or size of the particular helical elements utilized, it may be necessary to alter the number, spacing and/or size of slots 82.

An annular retainer means generally designated 88 is provided to continuously pre-load and urge wedge 42 into frusto-conical portion 68 of housing passageway 64. This retainer means includes a shoulder 90 having a threaded area 92 axially disposed therealong and adapted to threadedly cooperate with threaded area 70 in passageway cylindrical portion 66. A base 94 is disposed axially inward of shoulder 90 and includes an end area 96 which engages flange halves 76 so as to confine the wedge in the passageway frusto-conical portion in a pre-loaded condition. Retainer means 88 may advantageously include one or more openings 98 adapted to receive a spanner wrench or the like to facilitate convenient threaded advancement of the retainer into the passageway cylindrical portion.

The various components of the termination device or appliance thus far described may be advantageously constructed of an appropriate metal such as steel, aluminum or the like in order to provide the desired termination device strength and characteristics when it is placed into actual use. However, the particular materials used in such construction do not in any way form a part of the present invention.

When placed into practical application, termination device or appliance C is in a disassembled condition. The area of termination of sheathed cable A as shown in FIG. 3 initially has a first set of preformed helical rods or elements 104 closely disposed therearound over a longitudinal extent thereof in a helical lay of one hand. These elements have predetermined internal diameters and pitch lengths so as to be closely received around outer protective coating 10 of sheathed cable A. Helical rods or elements 104 may be similar to those utilized in the construction of other appliances such as those disclosed in U.S. Pat. Nos. 2,609,653 and 2,761,273 and may be manufactured by any suitable method such as that disclosed in U.S. Pat. No. 2,691,865, all of which aforementioned patents were assigned to the same assignee as the present development. In the arrangement shown, ten (10) such elements are utilized although a greater or lesser number may be employed as necessary. Generally, elements 104 will be constructed of aluminum, steel or similar metals, although molded plastics or the like may be used in some circumstances.

Housing body 58 may then be threaded onto cable member A through passageway 64 for later cooperation with the wedge. The housing body may simply be slid along the cable member to a position where it is temporarily out of the way and will not interfere with the remainder of the installation process. Wedge halves 44,46 which comprise wedge 42, alignment washer halves 72,74 and flange halves 76,78 may next be installed over a portion of the first set of preformed helical rods 104 and cable member A at the area of desired termination as shown in FIG. 3 so that it extends through bore 54 as defined by the longitudinal recessed areas included in each of the wedge halves. As previously noted, the dimensioning of these recesses is such that wedge 42 is closely received around the first set of helical rods 104 and cable member. The length of each rod 104 is such that they extend outwardly from wedge lead end 48 some desired distance for supporting and protecting the cable member.

A second set of preformed helical rods or elements 106 having a helical lay of the opposite hand as rods 104 are closely received around the first set of rods over a longitudinal extent thereof spaced outwardly from wedge lead end 48. In the arrangement shown, twelve (12) helical rods or elements 106 are employed although a greater or lesser number may be employed as necessary. As this second set approaches the wedge lead end, the individual rods 106 thereof closely encircle the wedge frusto-conical side wall 52 from the lead end to a point rearwardly adjacent rear end 50. The end areas of rods or elements 106 are located in and received by the twelve (12) radially inward extending slots 82 of flange halves 76,78 in the manner best shown in FIG. 4. This second set of elements acts to positively affix the wedge onto the first set of rods 104 and cable member A to thereby provide a retaining protuberance therealong.

Housing body 58 may then be slid back into a cooperative relationship with the wedge in the manner shown in FIG. 3 with the wedge being substantially received within frusto-conical portion 68 of housing passageway 64. The passageway frusto-conical portion is dimensioned to closely receive wedge 42 and that portion of the second set of helical rods or elements 106 which tightly encircle wedge frusto-conical side wall 52. Retainer means 88 may then be threadedly advanced into housing passageway cylindrical portion 66 until end area 96 of base 94 positively engages flange halves 76,78 to thereby confine the wedge in the housing.

Because wedge halves 44,46 are only affixed at wedge rear end 50, radial forces imparted to the wedge as it is forced into passageway frusto-conical portion 68 cause the wedge halves to be forced toward each other thereby decreasing the diameter of bore 54 and increasing the holding force exerted against first set of preformed helical rods 104 and the cable member. Such action can be caused by threaded advancement of retainer means 88 against the wedge whereby the wedge is pre-loaded and/or by loading of cable member A during use which urges the wedge further into the passageway frusto-conical portion. As installed and as shown in FIG. 3, the length of the preformed helical rods which comprise the first set are such that they extend outwardly from housing body first end 60 some desired distance. The second set of preformed helical rods 106 are also dimensioned to extend outwardly from housing body first end 60 along a longitudinal portion of the first set. The bell mouth configuration for housing passageway 64 at first end 60 prevents any severe cable stresses at that area.

An appliance mounting flange 110 fixedly mounted to the housing adjacent second end 62 facilitates convenient mounting of termination device or appliance C to an associated structure through means of a plurality of axially disposed mounting openings 112 passing through the flange. The individual inner strands or electrical conductors 14,16 may be operably connected to the conductors of associated equipment, instrumentation, test facilities and the like by conventional means. Moreover, it is also possible to employ other types and styles of mounting arrangements for mounting the appliance to associated structure without departing from the overall concepts of the present development. By way of example, a mounting member could be configured and dimensioned to be threadedly received in housing second end 62 in engagement with threaded area 70. This mounting member can advantageously also include a mounting opening or the like at the outermost end to facilitate mounting of the appliance to associated structure.

The termination device or appliance hereinabove described with reference to FIGS. 3 and 4 has several advantages over prior art devices. First, the two sets of preformed helical rods or elements 104,106 facilitate torque balance for torquing forces which might otherwise be applied to the cable member if a single set of helical rods was employed. Torque balance is a critical factor in termination devices for torque free cables and applications in which the cables support, tow or moore unrestrained payloads. Torque balance is also a critical factor in gripping certain synthetic strength member cables and the like in which any twisting of the strength members by the gripping device can cause failure at lower loads than with torque free appliances. Further, by passing the inner set of helical rods 104 through wedge bore 54, cable member A is protected from damage by the compression of the wedge halves. This can be a critical factor for certain cables such as those using synthetic strength members or other relatively fragile components.

Other specific advantages realized when using the subject development as shown in FIGS. 3 and 4 is that no special meticulous cable preparation is required, no special tools or fixtures are required and the termination device is useable immediately upon completion of the assembly procedure with no curing or further processing steps being required. Since the cable passes through the termination device intact, there is no degradation of electrical or mechanical characteristics thereof. Because more cross-sectional area of helical rods can be used, higher strength cables can be terminated with this device than is possible with a single helical rod set. Finally, the second set of helical rods or elements 106 adds stiffness in the immediate area of the termination housing and reduce the bending radius when off axis loads are applied. This reduces the stress concentration at the termination and provides improved fatigue resistance.

In addition to the type of sheathed cable member A shown and described with reference to FIG. 1, the termination device or appliance C can also be utilized with cables which are themselves comprised of a plurality of helically formed strands. In that event, the preformed rods 104 of the first set have a helical lay of the opposite hand as the cable strands and the preformed rods 106 of the second set have a lay of the same hand as the cable member strands.

Figure 5:
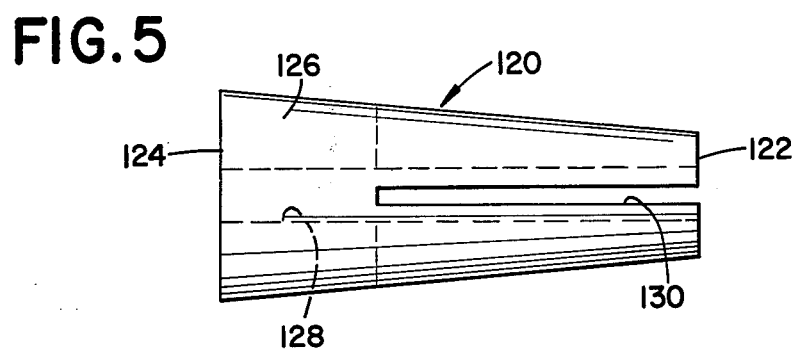
FIG. 5 is a side elevational view of a modified configuration for the wedge.

FIG. 5 shows a modified structural arrangement for a wedge which may be utilized in practicing the concepts of the subject development. For ease of illustration and appreciation of this modificaton, new numerals have been employed. In FIG. 5, the wedge has a wedge body generally designated 120 including opposed lead and rear ends 122,124. A generally frusto-conical side wall 126 tapers inwardly from the rear end toward the lead end and a cylindrical bore 128 communicates between the two ends. A plurality of elongated slots 130 extend from lead end 122 toward rear end 124 and communicate between frusto-conical side wall 126 and bore 128. While any number of such slots could be utilized, in the arrangement here described, four slots which are equidistantly spaced around the wedge are preferably contemplated. Thus, the wedge arrangement shown in FIG. 5 is a one piece construction and slots 130 allow compression of a portion of the wedge into a tighter gripping relationship with the first set of helical rods and cable member as the wedge is inserted into the frusto-conical portion of the housing in the manner hereinabove described with reference to wedge 42 of FIGS. 3 and 4. When using this modified wedge arrangement, the remainder of the termination device structure is substantially identical to that previously described. It is also possible, and in some cases desirable, to include slots similar to slots 130 in wedge halves 44,46 to further enhance the gripping action thereof.

FIG. 6 shows a side elevation of a termination device D having certain modified structural characteristics for practicing the overall concepts of the present development and FIG. 7 is an enlarged cross-sectional view of a portion of the structural arrangement shown in FIG. 6 at the cable termination area. Termination device D is particularly suitable for use with the armored type cable member B shown in FIG. 2 and will be described with particular reference thereto. The overall operation and advantages are substantially similar to those previously described and there is substantial component and cooperative identity with the FIGS. 3 and 4 arrangement. Generally, termination device or appliance D is comprised of a wedge 140, a subhousing 142, a housing 144 and a strain relief assembly 146. These various components are preferably constructed from steel, aluminum or like although many other materials could also be advantageously utilized to accommodate particular termination device applications and environments of application.

More particularly, wedge 140 is defined by a pair of mating wedge halves 150,152 so that the wedge has a frusto-conical side wall 154 extending between a lead end 156 and a rear end 158. Each wedge half includes a longitudinally disposed cavity or recessed area for cooperatively defining a bore 160 between ends 156,158. An alignment washer 162 is fixedly secured to the wedge halves at rear end 158 by convenient means (not shown) in order to retain desired longitudinal mating alignment between the two halves.

Subhousing 142 is defined by a generally cylindrical subhousing body 170 having a through opening 172 extending therethrough. This through opening includes a generally cylindrical portion 174 extending inwardly from subhousing rearward end 176 and which merges into a generally frusto-conical portion 178 tapering inwardly toward subhousing forward end 180. Cylindrical portion 174 is threaded as at 182 inwardly from rearward end 176. The subhousing body also has a reduced diameter area adjacent forward end 180 so as to define a radial locating shoulder area 184.

Housing 144 is defined by a housing body 190 having a first end 192 and a second end 194. A generally cylindrical passageway 196 communicates between ends 192,194. This passageway decreases in diameter adjacent first end 192 so as to define a radial locating shoulder area 198 adapted to cooperate with shoulder 184 of subhousing body 170. As will be seen in FIG. 7, subhousing body 170 is dimensioned to be fairly closely slidably received within the conformation of housing body passageway 196.

An adaptor bracket generally designated 206 is threadedly received as at 208 onto housing body 190 at first end 192. A set screw 210 penetrates the adaptor bracket side wall into retaining engagement with the housing body.

Strain relief assembly 146 comprises an elongated strain relief body having the rear end fixedly received on adaptor bracket 206 in order that the assembly may be coaxially mounted longitudinally of the housing body. The strain relief assembly may take many alternative forms and configurations without in any way departing from the overall intent or scope of the present invention. However, advantageously included in the assembly is a compression seal gland 220 received within housing body passageway 196 adjacent first end 192. Adjacent this gland and spaced toward the adaptor bracket is a gland backup washer 222 and adjacent this backup washer is still another washer 224 which is in engagement with the adaptor bracket itself. An elongated tubular liner 226 extends between the two ends of the strain relief assembly. At the outermost end of the strain relief assembly is a nose member generally designated 228 which may be advantageously designed so as to apply a slight compressive force against the cable member when the termination device has been installed.

At least compression seal gland 220, washer 224 and tubular liner 226 are advantageously constructed from a resilient plastic or rubber-like material.

In utilizing the termination device or appliance D shown in FIGS. 6 and 7 with the armored cable B of FIG. 2, strain relief assembly 146, adaptor bracket 206, housing body 190 and subhousing body 170 are first placed or threaded onto the cable from the end thereof which is to be terminated and moved to a position along the cable where they will not interfere with the preliminary installation steps. Following this threading, a portion of the outer layer 32 of second armor strands are unwound from their encircling relationship with the inner layer armor strands 30 so as to facilitate installation of wedge halves 150,152 at the desired location along inner armor layer and cable member B. Since strands 30,32 of the inner and outer layers extend coextensive with each other along the cable core, it is also necessary to slightly trim the end areas of those strands or elements 32 comprising the outer layer in order to have appropriate clearances within the termination device.

Once the wedge halves have been located on inner armor strands 30 so that these members are closely received through wedge bore 160 as defined by the longitudinal recesses in the wedge halves and with alignment washer 162 appropriately affixed to read end 158 of the wedge for maintaining alignment of the wedge halves, the outer layer of armor strands or elements 32 may be wrapped around the wedge from lead end 156 to rear end 158 thereby closely encircling the wedge frusto-conical side wall 154. This arrangement acts to affix the wedge to cable member B and provide a protuberance therealong to facilitate termination. A convenient tie wire 234 is disposed around inner armor layer strands 30 adjacent the end thereof for maintaining the helically wrapped condition. The outermost ends of electrical conductors 20,22 extending outwardly from the core of cable member B are operably affixed to associated electrical conductors 236,238 at conventional connectors 240,242. Conductors 236,238 extend at least to a terminal-like member 250 penetrating a cover plate or member 252.

Subhousing body 170 may then be run up onto and over wedge 140 so that the wedge and that portion of outer armor layer 32 which closely encircles the wedge are at least substantially received in frusto-conical portion 178 of subhousing opening 172. As the wedge is forced into this frusto-conical portion, resulting radial forces transmitted to the wedge cause the wedge halves to be forced together from adjacent lead end 156 toward read end 158 to thereby provide a greater gripping action against inner armor layer elements 30.

An annular retainer member 254 having a threaded shoulder area 256 and a base area 258 is threadedly received in threaded area 182 of subhousing body 170 through opening cylindrical portion 174 in a manner such that base area 258 confines the wedge at least substantially in opening frusto-conical portion 178. Here too, the retainer member pre-loads the wedge into the subhousing opening so that the wedge halves closely grip inner layer of armor elements and cable members.

Housing body 190 having strain relief assembly 146 connected thereto as shown in FIGS. 6 and 7 is next run up onto and over subhousing body 170 so that the subhousing body is received within housing body passageway 196. Shoulder 184 on the subhousing body engages shoulder 198 in housing body passageway 196 to positively locate the subhousing therein. A tubular spacer sleeve generally designated 260 is closely slidably received in housing body passageway 196 with the inner end thereof engaging rearward end 176 of the subhousing body to retain the subhousing in a located position within housing body 190. An annular pusher plate generally designated 262 is received in passageway 196 at the other end of spacer sleeve 260 whereby a fluid chamber area 264 is generally defined between wedge rear end 158 and pusher plate 262. This fluid chamber area may be conveniently filled with oil to prevent inflow of water thereinto when the termination device is, for example, towed beneath the water in undersea use. An annular sealing ring 266 is interposed between pusher plate 262 and cover plate 252. The cover plate sealingly covers the end of housing passageway 196 at housing second end 194 and is fixedly mounted thereto by convenient means such as a plurality of mechanical fasteners 268. Terminal-like member 250 may include appropriate coupling means to permit conductors 236,238 to pass therethrough or to be directly coupled to associated equipment, facilities, instrumentation or the like.

Housing body 190 also includes a mounting area generally designated 274 having a pair of spaced apart circumferential grooves 276,278. Seal rings 280,282 are received in these grooves to facilitate a fluid tight mounting for the termination device with associated structure, equipment, instrumentation and the like. Other types of mounting arrangements could also be advantageously employed to accomodate specific mounting needs and appliance applications. A fluid passage 284 extends through the housing from a shoulder 286 to a filler opening 288. This filler opening receives a convenient cap 290 which is selectively removable to permit introduction of oil into opening 288, through fluid passage 284 and into that structure which may be associated with the termination device itself. Here again, this oil filling arrangement facilitates protection for the structure when the termination device will be subjected to water or the like as in undersea use.

The structural arrangement shown in FIGS. 6 and 7 operates and protects an armored cable member in much the same manner as the arrangement shown in FIGS. 3 and 4. Thus, loading of the cable during use acts to further urge the wedge into the frusto-conical portion of the subhousing opening to enhance the gripping force of the wedge on inner layer of armor elements and cable member. With specific regard to armored type cable, the arrangement shown in FIGS. 6 and 7 requires no special tools or fixtures for installation, will accomodate inner and outer layer armor strands or elements of different diameters, requires no externally applied or self generated heat, and does not require meticulous preparation of the armor strands or elements as by cleaning, straightening or special bending. Moreover, the termination device or appliance shown in FIGS. 6 and 7 is ready for use immediately upon completion of the assembly steps and requires no curing time as has been the case for prior potted type termination devices.

Both armor layers of the cable member are gripped by the device to effectively and advantageously utilize the entire armored cable structure. The inner layer of armor elements remain in tact and protect the electrical conductors or the core passing through and beyond the wedge member. Strain relief assembly 146 acts to support a longitudinal portion of cable B extending outwardly from housing passageway 186 at housing first end 192 in order to prevent any undue bending forces being applied to the cable member at the housing area. Depending on the particular application for the termination device, it is possible to eliminate this strain relief assembly.

Figure 8:
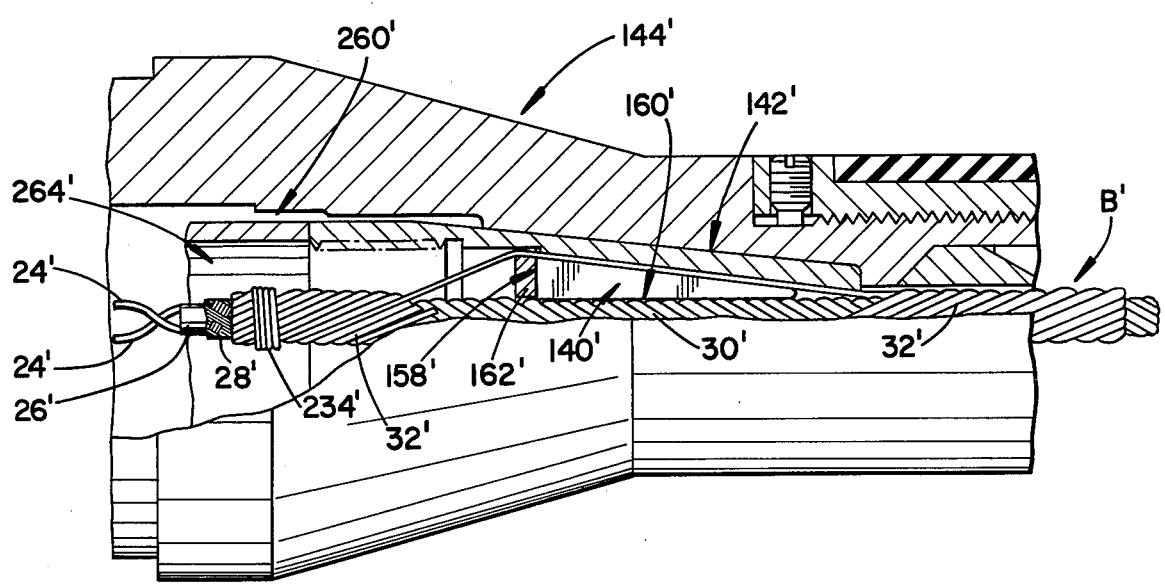

FIG. 8 is an arrangement substantially similar to the arrangement shown and described above with reference to FIGS. 6 and 7, except for the manner of accomodating the outer armor strands or elements. Because of the close identity between these two arrangements, like components are identified by like numerals including a primed (') suffix and new components are identified by new numerals.

In FIG. 8, subhousing 142' is slightly elongated in order to accomodate a return wrap for the armor strands or elements 32' of the outer layer. Because of the return wrap arrangement, the retainer member employed to preload and confine the wedge within the frusto-conical portion of the housing or subhousing passageways may be eliminated from use. It is simply necessary to employ tubular spacer sleeve 260' for engaging the rear end area of subhousing 142' for maintaining it in position within the housing passageway.

According to this modification, when encircling wedge 140' with the armor strands or elements 32' of the outer layer and rather than cutting these elements so that they end adjacent rear end 158 of the wedge, the helical elements are disposed to form a return wrap from wedge rear end 158' back to the first or inner layer of armor elements 30'. At that area, the elements of the outer layer are disposed in an encircling relationship with the elements 30' of the inner layer to extend along a longitudinal section thereof into fluid chamber area 264'. Tie wire or wrap 34' is wrapped about the outer armor layer to prevent undesired unwrapping of either layer following termination device installation and use. The remainder of the FIG. 8 structure is substantially identical to that hereinabove previously described with reference to FIGS. 6 and 7.

The specific configurations for the wedge, housing and subhousing arrangements shown with regard to the embodiments of FIGS. 3–8 may be modified from the specific configurations shown in these Figures and described hereinabove without in any way departing from the overall intent or scope of the present invention. Some modifications may be desirable and/or necessary to accommodate specific preformed helical rod elements for the type of cable shown in FIG. 1, to accommodate specific types of armored cable such as that shown in FIG. 2 or to facilitate a particular termination device or appliance use. Such changes may include dimensional modifications or additional attendant structure and, again, in no way depart from the overall intent or scope of the present invention.

The subject new development has been described with reference to preferred embodiments. Obviously, modifications and alterations will occur to others upon the reading and understanding of the specification. It is intended to include all such modifications and alterations insofar as they come within the scope of the appended claims or the equivalents thereof.

Having thus described my development, I now claim:

1. A termination appliance installation for an elongated cable member, said installation comprising in combination:

a first set of helical elements generally of a predetermined internal diameter and pitch length wrapped in an encircling relationship about said cable member for at least a predetermined distance therealong in a helical lay of one hand;

a cable member receiving collapsible wedge having a generally frusto-conical outer side wall configuration extending between a smaller diameter lead end and a larger diameter rear end with a substantially cylindrical central bore passing therethrough between said ends, said wedge being positioned with said first set and cable member received through said bore and extending outwardly therefrom at both said wedge lead end and said wedge rear end;

a second set of helical elements generally of a predetermined internal diameter and pitch length closely wrapped in a generally encircling relationship along said wedge outer side wall from at least adjacent said rear end to said lead end and then in an encircling relationship with said first set and cable member for at least a predetermined distance therealong outwardly from said wedge lead end whereby said wedge is secured to said first set and cable member and provides a protuberance therealong, the helical lay of said second set being of the opposite hand from the lay of said first set;

an elongated housing having first and second ends with a passageway communicating between said ends, said passageway having a generally cylindrical portion extending inwardly from said second end and merging into a generally frusto-conical portion tapering inwardly toward said first end, said frusto-conical portion closely and at least substantially receiving said wedge and said second set of helical elements closely wrapped in an encircling relationship with said outer side wall of said wedge, said cable member and said first and second sets of helical elements passing outwardly from said passageway at said housing first end; and, retainer means positioned in said generally cylindrical portion of said passageway for acting against said wedge outwardly of said first set of elements for urging said wedge into said frusto-conical portion of said housing and toward said first end thereof to grip said second set of helical elements between said outer side wall of said wedge and the surface of said frusto-conical portion of said housing and to collapse said wedge for gripping said first set of elements within said bore.

2. The combination as defined in claim 1 wherein said frusto-conical wedge is comprised of a pair of mating half sections cooperatively defining said bore to have a diameter such that radial pressure applied to said half sections by insertion of said wedge into said passageway frusto-conical portion is translated to that portion of said first set and cable member passing therethrough for increasing the retaining force of said wedge thereon, and means for joining said half sections together in a longitudinally aligned relationship at said wedge rear end.

3. The combination as defined in claim 2 further including a circular flange area having a diameter slightly greater than the diameter of said wedge side wall at said wedge rear end so as to extend radially outward thereof circumferentially therearound, said flange area further including a plurality of radially inward extending slots generally axially along the outer peripheral surface thereof, the individual elements which comprise said second set being received in said flange area slots.

4. The combination as defined in claim 3 wherein said flange area is comprised of at least one separate flange member interposed between said retainer means and wedge rear end, said combination further including means rigidly affixing said at least one flange member to said wedge rear end generally coaxial thereof.

5. The combination as defined in claim 1 wherein at least said passageway frusto-conical portion is defined by a separate sub-housing closely received in said housing passageway from said housing second end.

6. The combination as defined in claim 1 wherein said second set of helical elements encircle at least a portion of the length of said first set extending outwardly from said bore at said wedge lead end, then closely encircle said wedge from said lead end to said rear end and the extend back to an encircling relationship with a portion of the length of said first set protruding outwardly from said bore at said wedge rear end.

7. The combination as defined in claim 1 wherein said first and second sets comprise preformed helical rods affixed to said cable member over selected lengths thereof at said appliance installation, said first set of helical rods tightly encircling a portion of said cable member and said second set of helical rods tightly encircling at least a portion of said first set at said wedge lead end for balancing the torque applied to said cable member by said appliance installation.

8. The combination as defined in claim 1 wherein said cable member comprises an armored type cable having a conductor inner core with said first set comprising an inner layer of armor strands and said second set comprising an outer layer of armor strands, said inner and outer layers extending substantially coextensive with said conductor inner core.

9. The combination as defined in claim 8 further including an elongated strain relief assembly fixedly mounted to said housing at said housing first end to extend coaxially outward therefrom, said strain relief assembly being closely received over a length of said armored cable including said inner and outer layers of armor strands for reducing any bending strain imparted to said armored cable at said housing first end.

10. The combination as definded in claim 8 further including a closure member associated with said housing second end for closing said passageway and defining a chamber between said wedge and closure member, said closure member including means receiving an electrical conductor therethrough operably connected in said chamber to said conductor inner core.

11. The combination as defined in claim 10 wherein said chamber is filled with oil.

* * * * *

UNITED STATES PATENT AND TRADEMARK OFFICE
CERTIFICATE OF CORRECTION

PATENT NO. : 4,189,620
DATED : February 19, 1980
INVENTOR(S) : William F. Stange It is certified that error appears in the above—identified patent and that said Letters Patent is hereby corrected as shown below:

In the patent heading, the following patent assignment data is added following the line identified as [76] Inventor:

Assignee:   Preformed Line Products Company
                    Mayfield Village, Ohio Signed and Sealed this Tenth Day of June 1980

[SEAL]

*Attest:*

SIDNEY A. DIAMOND

*Attesting Officer*        *Commissioner of Patents and Trademarks*